United States Patent
Nakajima

(10) Patent No.: US 10,660,147 B2
(45) Date of Patent: May 19, 2020

(54) COMMUNICATION APPARATUS, CONTROL METHOD, AND NON-TRANSITORY COMPUTER-READABLE STORAGE MEDIUM FOR CONTROLLING WIRELESS CONNECTIONS

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 14/943,220

(22) Filed: Nov. 17, 2015

(65) Prior Publication Data

US 2016/0142377 A1   May 19, 2016

(30) Foreign Application Priority Data

Nov. 19, 2014   (JP) .................................. 2014-234908

(51) Int. Cl.
*H04W 76/14* (2018.01)
*H04W 12/08* (2009.01)
(Continued)

(52) U.S. Cl.
CPC ........... *H04W 76/14* (2018.02); *H04W 12/02* (2013.01); *H04W 12/08* (2013.01); *H04W 84/12* (2013.01); *H04W 84/20* (2013.01)

(58) Field of Classification Search
CPC .... H04L 63/04; H04W 12/08; H04W 76/023; H04W 84/12; H04W 84/20
See application file for complete search history.

(56) References Cited

U.S. PATENT DOCUMENTS 8,811,242 B2 * 8/2014 Falk .................. H04L 29/12264
370/310
2004/0053622 A1 * 3/2004 Nakakita ............. H04L 63/0428
455/450
(Continued)

FOREIGN PATENT DOCUMENTS

JP   2008022165 A    1/2008
JP   2010268301 A   11/2010
(Continued)

OTHER PUBLICATIONS

Full Machine Translation from WIPO Patentscope Website of JP 2014-072764.*

(Continued)

*Primary Examiner* — David Le
(74) *Attorney, Agent, or Firm* — Carter, DeLuca & Farrell LLP

(57) ABSTRACT

A communication apparatus which performs communication in a wireless LAN by operating as a base station or a terminal station of the wireless LAN determines, if currently connected to the wireless LAN as the terminal station when receiving the connection request from a first another apparatus, whether to cause the first another apparatus to connect to the currently connected wireless LAN. Then, the communication unit communicates with the first another apparatus via a second another apparatus which operates as the base station in the currently connected wireless LAN when determining to cause the first another apparatus to connect to the currently connected wireless LAN, and communicates with the first another apparatus not via the second another apparatus when determining not to cause the first another apparatus to connect to the currently connected wireless LAN.

18 Claims, 11 Drawing Sheets

(51) Int. Cl.
*H04W 12/02* (2009.01)
*H04W 84/12* (2009.01)
*H04W 84/20* (2009.01)

(56) References Cited

U.S. PATENT DOCUMENTS

| | | | | |
|---|---|---|---|---|
| 2005/0148326 | A1* | 7/2005 | Nogawa | H04L 41/0806 |
| | | | | 455/420 |
| 2006/0120313 | A1* | 6/2006 | Moritomo | H04W 52/0225 |
| | | | | 370/311 |
| 2013/0021971 | A1* | 1/2013 | Jain | H04W 76/02 |
| | | | | 370/328 |
| 2013/0063082 | A1* | 3/2013 | Lee | H02J 7/025 |
| | | | | 320/108 |
| 2014/0165165 | A1* | 6/2014 | Story, Jr. | H04L 63/08 |
| | | | | 726/6 |
| 2014/0304777 | A1* | 10/2014 | Lehtovirta | H04L 63/164 |
| | | | | 726/3 |
| 2015/0143464 | A1* | 5/2015 | Vallee | H04L 41/12 |
| | | | | 726/3 |
| 2016/0021693 | A1* | 1/2016 | Doetsch | H04W 76/023 |
| | | | | 370/329 |
| 2017/0026900 | A1* | 1/2017 | Goto | G06F 17/30725 |

FOREIGN PATENT DOCUMENTS

| | | |
|---|---|---|
| JP | 2011114377 A | 6/2011 |
| JP | 2014-072764 A | 4/2014 |
| JP | 2014072786 A | 4/2014 |
| JP | 2014127871 A | 7/2014 |

OTHER PUBLICATIONS

Machine Translation for JP2014072764, Yada Hironori (Year: 2014).*
Machine Translation for JP2016100691, Yada Hironori (Year: 2016).*
Japanese Office Action corresponding to Japanese Appln. No. 2014234908 dated Aug. 20, 2018 (5 pages).

* cited by examiner

F I G. 1
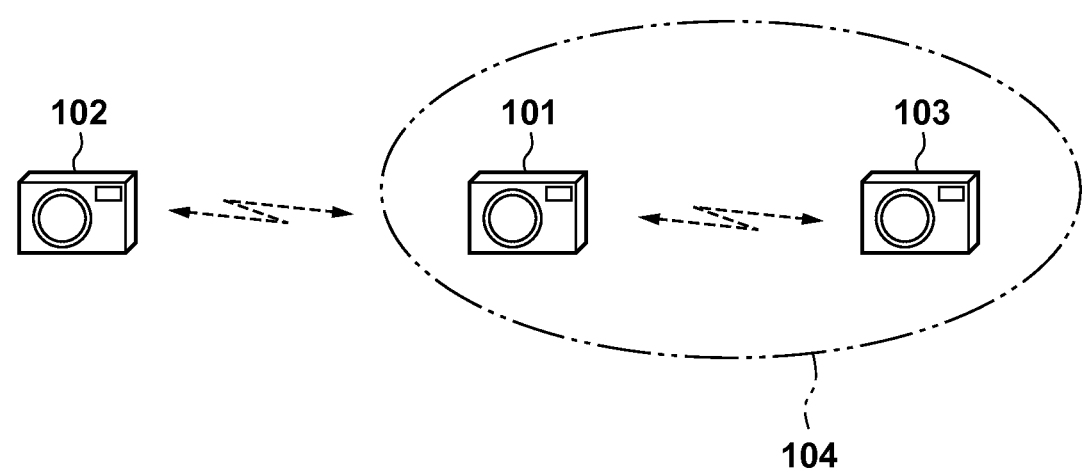

COMMUNICATION APPARATUS, CONTROL METHOD, AND NON-TRANSITORY COMPUTER-READABLE STORAGE MEDIUM FOR CONTROLLING WIRELESS CONNECTIONS

BACKGROUND OF THE INVENTION

Field of the Invention

The present invention relates to a connection control technique of wireless communication.

Description of the Related Art

In recent years, a case in which a communication function by a wireless LAN (Local Area Network) is mounted in not only a PC (Personal Computer) but also a terminal device such as a cellular phone, a digital camera, or a printer has increased in number. The wireless LAN includes, as connection forms, an infrastructure mode in which a terminal performs communication upon connecting to a base station, and an ad hoc mode in which terminals directly communicate with each other without going through the base station.

The base station is necessary in communication in the infrastructure mode. However, there is proposed a technique in which a terminal has a simplified base station function even in an environment having no base station to implement communication in the infrastructure mode between terminals. The Wi-Fi Alliance as the wireless LAN industrial group standardizes a Wi-Fi Direct which defines the specification for implementing direct communication between terminals using the terminal having the simplified base station function. The Wi-Fi Direct describes a method of deciding a device operating as a simplified base station, a method of setting parameters for connection to a device serving as the simplified base station, and a connection method between terminals complying with the specification.

The Wi-Fi Direct defines the device operating as the simplified base station as a P2P (Peer-to-Peer) GO (Group Owner) and a terminal device connecting to the P2P GO as a P2P Client. Note that the P2P GO will be referred to as "GO" and the P2P Client will be referred to as "Client" hereinafter. First, capability information is exchanged between the terminals to decide a device serving as the GO. The device decided as the GO activates the simplified base station function to establish a wireless LAN network. The Client executes wireless LAN parameter setting by WPS (Wi-Fi Protected Setup), thereby performing automatic connection to the network by the wireless LAN network established by the GO. Accordingly, the GO and the Client form a wireless LAN network called a P2P group. Direct communication can be performed by the wireless LAN between the GO and the Client in the P2P group (see Japanese Patent Laid-Open No. 2014-072764).

When performing the Wi-Fi Direct, a communication apparatus compatible with a service to be executed before connection can be retrieved. In this case, a search for the service is executed by using a Service Discovery Request frame and a Service Discovery Response frame. This allows the communication apparatus to discover another apparatus compatible with the service before connection, connect to the other discovered apparatus by the Wi-Fi Direct, and perform communication for a desired service.

However, when performing Wi-Fi Direct connection between the first apparatus and the second apparatus compatible with the service, one of the apparatuses may currently be connected to an existing wireless network. For example, when the first apparatus is currently connected to the wireless network as the GO, communication related to the service can be performed by causing the second apparatus to be connected to that wireless network as the Client. On the other hand, when the first apparatus is currently connected to the wireless network as the Client, two connection methods are available. The one is a method of executing a service by causing the second apparatus to join the wireless network to which the first apparatus is connected as the Client. The other one is a method of performing connection by forming a new wireless network in addition to the existing wireless network between the first apparatus and the second apparatus.

When executing the service, there are two cases in which it is more appropriate to utilize the existing wireless network and it is more appropriate to form the new wireless network. For example, a wireless resource is consumed when the new wireless network is formed. On the other hand, when communication between communication apparatuses is performed via another apparatus, a security problem may arise in some cases.

The present invention provides a technique capable of selecting between forming the new wireless network and connecting to the existing wireless network appropriately when staring communication.

SUMMARY OF THE INVENTION

According to one aspect of the present invention, there is provided a communication apparatus, comprising: a communication unit configured to perform communication in a wireless LAN by operating as one of a base station and a terminal station of the wireless LAN; a reception unit configured to receive a connection request from a first another apparatus; a determination unit configured to determine, if the communication apparatus is currently connected to the wireless LAN as the terminal station when the reception unit receives the connection request, whether to cause the first another apparatus to connect to the currently connected wireless LAN; and an establishment unit configured to establish a wireless LAN different from the currently connected wireless LAN by the communication apparatus and the first another apparatus when the determination unit determines not to cause the first another apparatus to connect to the currently connected wireless LAN, wherein the communication unit communicates with the first another apparatus via a second another apparatus which operates as the base station in the currently connected wireless LAN when the determination unit determines to cause the first another apparatus to connect to the currently connected wireless LAN, and communicates with the first another apparatus not via the second another apparatus in the wireless LAN established by the establishment unit when the determination unit determines not to cause the first another apparatus to connect to the currently connected wireless LAN.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a view showing an example of the arrangement of a wireless communication system;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. Note that the technical scope of the present invention is determined by appended claims and is not limited by the following individual embodiments.

(Arrangement of Wireless Communication System)

FIG. 1 shows an example of the arrangement of a wireless communication system according to this embodiment. This wireless communication system includes a first camera 101, a second camera 102, and a third camera 103. The first camera 101 and the third camera 103 are in a state capable of performing communication upon being connected with each other in a wireless network 104 formed by at least one of them. In this embodiment, the wireless network 104 is established by, for example, a wireless LAN complying with the IEEE802.11 standard series. However, the wireless network 104 may be established by a standard or a system other than this.

Each of the first camera 101, the second camera 102, and the third camera 103 is a communication apparatus having a communication function by the wireless LAN. Furthermore, each of the first camera 101, the second camera 102, and the third camera 103 has a communication function by the Wi-Fi Direct, and can be compatible with communication processing based on a Wi-Fi Direct protocol. Note that a case in which a service to be executed after forming a P2P (Peer-to-Peer) group is an image transfer service will be described below.

(Arrangement of Camera)

Figure 2:
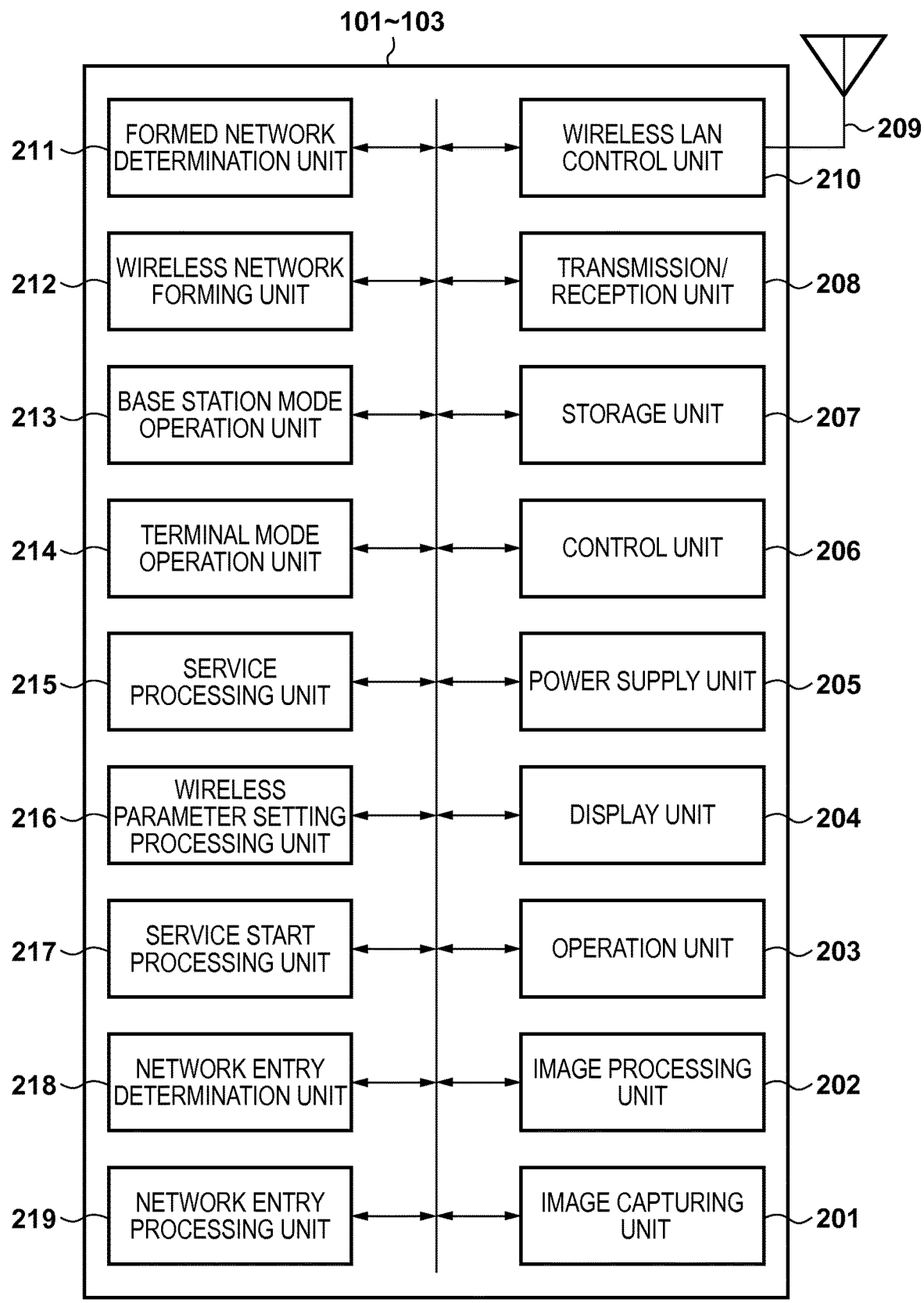
FIG. 2 is a block diagram showing an example of the functional arrangement of a camera having a communication function.

An example of the functional arrangement of each of the first camera 101 to the third camera 103 having the communication function will be described with reference to FIG. 2. In FIG. 2, an image capturing unit 201 of each camera includes a CCD, a lens, and the like. An image processing unit 202 executes image processing of an image and the like captured by the image capturing unit. An operation unit 203 is configured to accept an operation by a user of each of the first camera 101 to the third camera 103 and includes operation buttons and the like. A display unit 204 performs various types of display modes and outputs information recognizable by vision like an LCD or an LED. A power supply unit 205 supplies a power supply voltage to the whole apparatus. A control unit 206 controls the whole apparatus. A storage unit 207 stores various kinds of information such as control programs executed by the control unit 206, wireless LAN communication parameters, and communication partner apparatus information. Various kinds of operations to be described later and control of the whole apparatus are performed by causing the control unit 206 to execute control programs stored in the storage unit 207.

A transmission/reception unit 208 performs at least one of transmission and reception of a signal by wireless communication, and performs transmission/reception control in accordance with the communication data protocol of each layer. An antenna 209 is configured to perform wireless communication by the wireless LAN. A wireless LAN control unit 210 includes a driver or the like which performs wireless LAN RF control, wireless LAN communication processing, and various control operations of the wireless LAN complying with the IEEE802.11 series. The wireless LAN control unit 210 also executes the Wi-Fi Direct related protocol processing and driver control.

A formed network determination unit 211 determines whether a local apparatus joins a wireless network that has already been formed. A wireless network forming unit 212 executes processing for forming the wireless network (P2P group) when the local apparatus operates as one of a base station mode operation unit 213 and a terminal mode operation unit 214. The base station mode operation unit 213 is a function unit for the local apparatus to operate as the base station in the wireless LAN when it plays a role of GO (Group Owner) in the Wi-Fi Direct. The terminal mode operation unit 214 is a function unit for the local apparatus to operate as a Client in the Wi-Fi Direct or a terminal station in the wireless LAN.

A service processing unit 215 executes processing of various kinds of services executable by the local apparatus. A service executed by the service processing unit 215 is, for example, the image transfer service. This embodiment will exemplify a case in which the service processing unit 215 executes the image transfer service, but is not limited to this.

A wireless parameter setting processing unit 216 executes parameter setting processing needed to form the wireless network. This setting processing includes, for example, Wi-Fi Protected Setup (to be referred to as "WPS" hereinafter). A network entry determination unit 218 determines whether to cause the communication partner apparatus which executes a new service to enter the wireless network when the formed network determination unit 211 determines that the local apparatus joins the wireless network that has already been formed. A network entry processing unit 219 executes processing for causing the communication partner apparatus to enter the wireless network when the network entry determination unit 218 determines to cause the communication partner apparatus to enter the wireless network where the local apparatus joins.

Note that each block according to the above-described arrangement example has been shown as merely an example, but the plurality of function blocks may be arranged as one functional block. Alternatively, any functional block may be arranged into a plurality of further functional blocks.

(Processing Procedure)

Processing Example 1

The first example of the procedure of processing executed in this embodiment will now be described with reference to FIGS. 3 to 9. Note that in this embodiment, a service start requesting side and a service start requested side execute processing in the different procedures when communication related to a service between the communication apparatuses is performed. The second camera 102 and the third camera 103 are the communication apparatuses on the service start requesting side, and the first camera 101 is the communication apparatus on the service start requested side. As described above, the service here is the image transfer service. Note that in this embodiment, whether each communication apparatus (camera) operates as the service start requesting side or the service start requested side is decided by a user selection. Note that this decision may be determined, for example, in the manufacturing stage of the apparatus or the like in addition to the user selection. Furthermore, each communication apparatus may be configured to be operable both on the service start requesting side and on the service start requested side.

Figure 3:
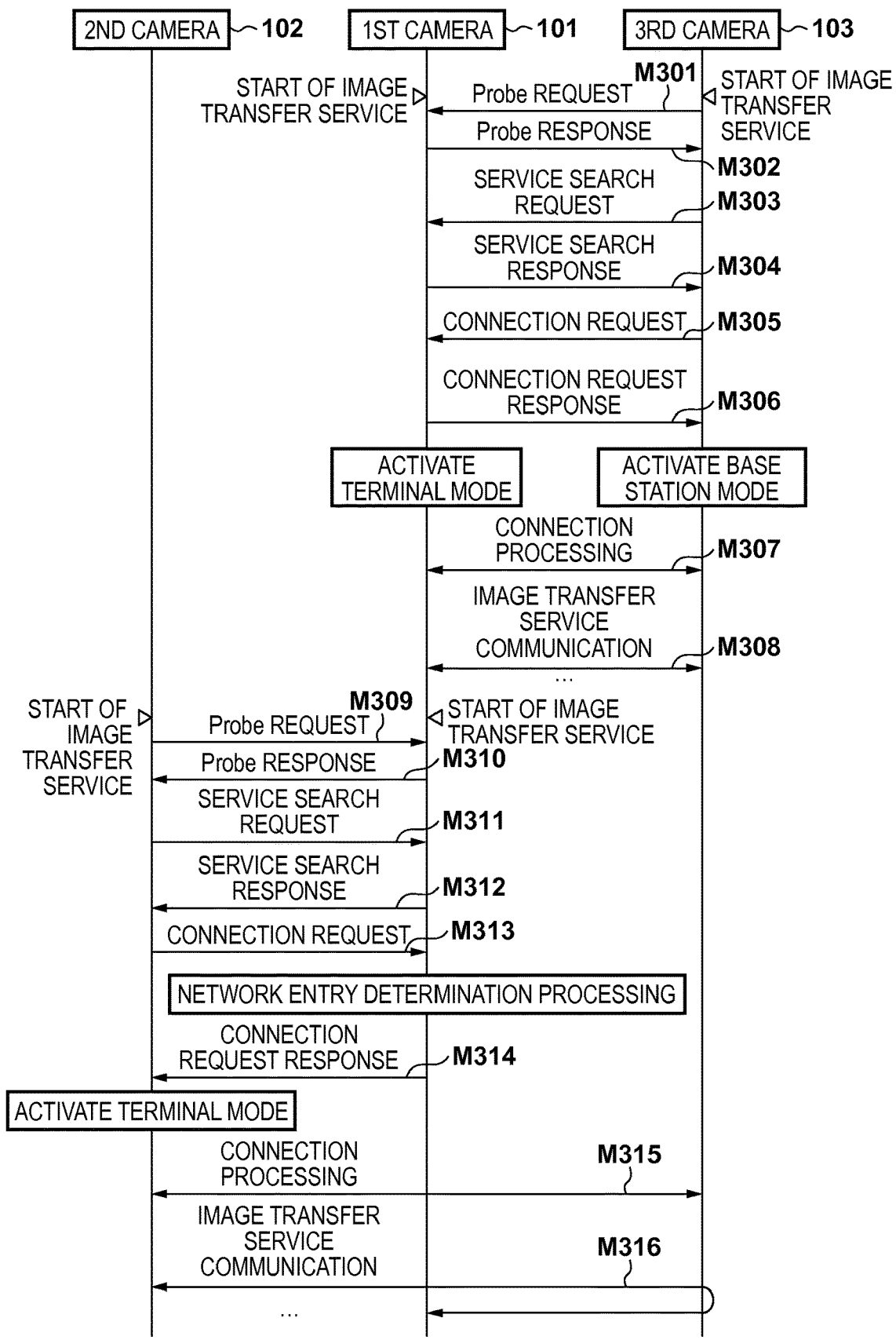
FIG. 3 is a sequence chart showing the first example of the flow of a signal transmitted/received in the entire wireless communication system.
Figure 4:
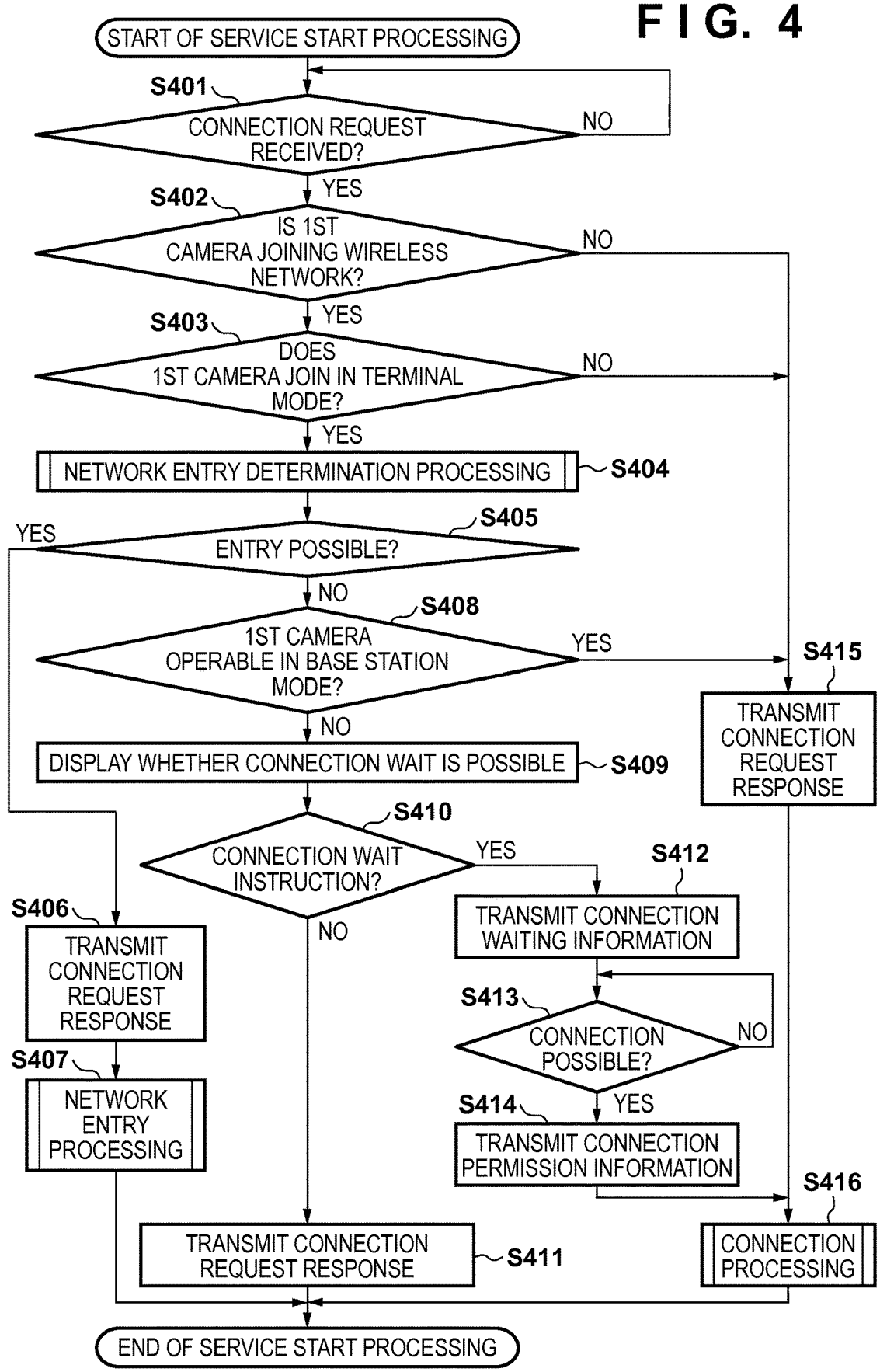
FIG. 4 is a flowchart showing an example of the sequence of service start processing by a first camera 101.
Figure 5:
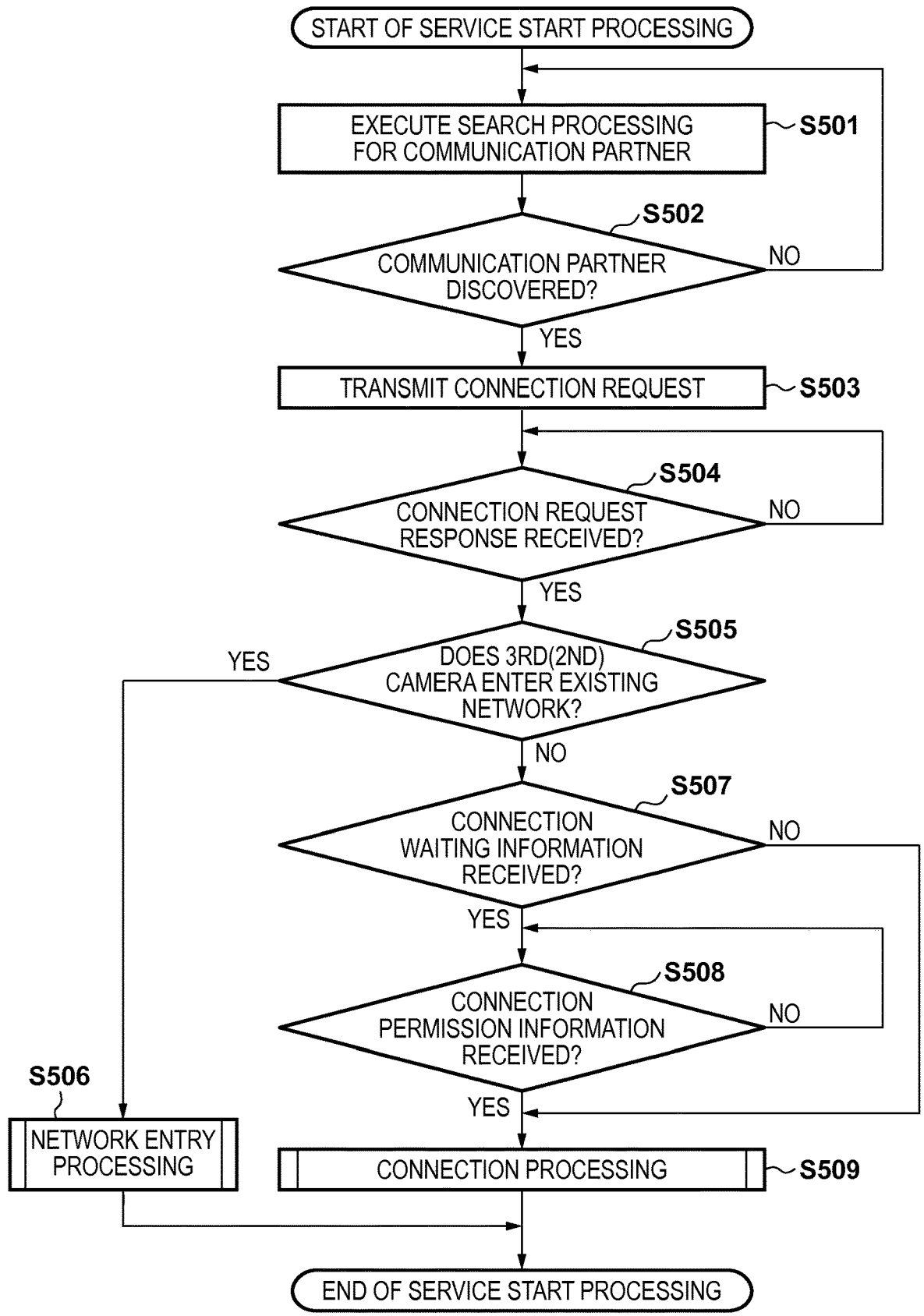
FIG. 5 is a flowchart showing an example of the sequence of service start processing by a second camera 102 and a third camera 103.
Figure 6:
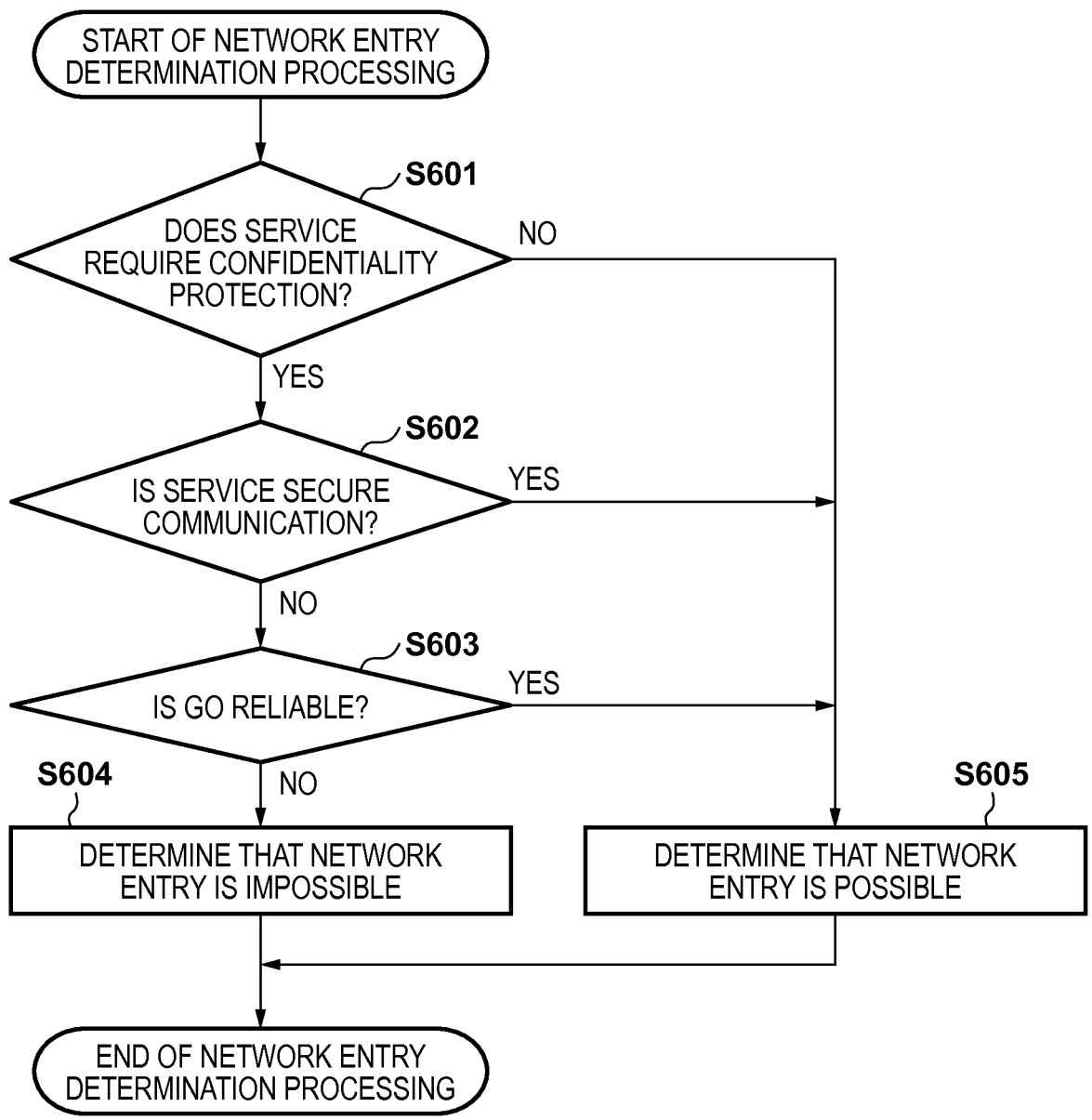
FIG. 6 is a flowchart showing an example of the sequence of network entry determination processing by the first camera 101.
Figure 7:
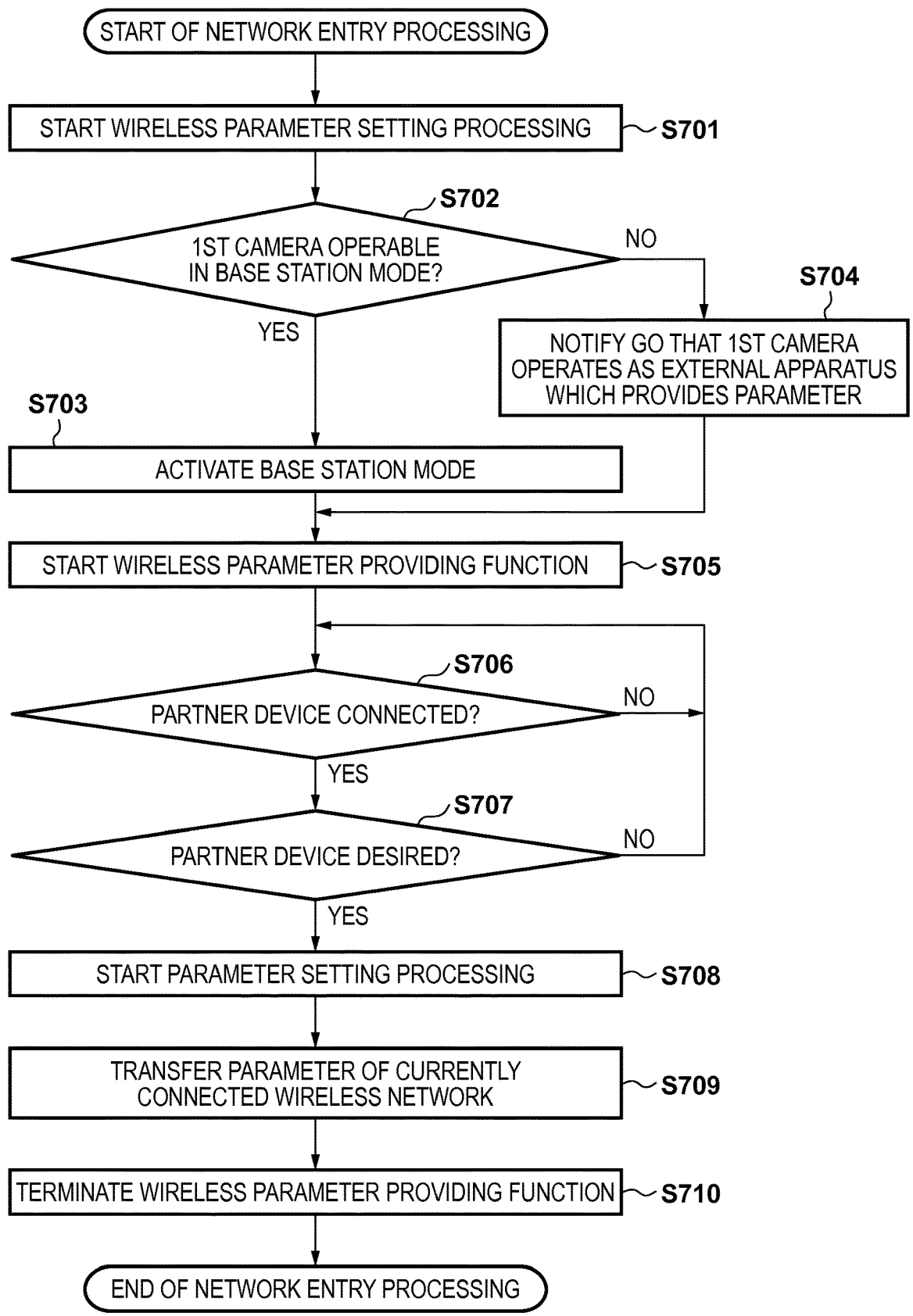
FIG. 7 is a flowchart showing an example of the sequence of network entry processing by the first camera 101.

FIG. 3 is a sequence chart showing the flow of a signal (message) transmitted/received in the entire wireless communication system in this processing example. FIGS. 4 and 5, respectively, are flowcharts showing examples of the procedures of processing executed by the communication apparatuses on the service start requested side (first camera 101) and the service start requesting side (the second camera 102 and the third camera 103). FIGS. 6 and 7, respectively, are flowcharts showing examples of the procedures of network entry determination processing and network entry processing executed by the first camera 101.

First, when the first camera 101 and the third camera 103 accept an image transfer service start operation by the user, the third camera 103 serving as the communication apparatus on the service start requesting side executes search processing for a communication partner (step S501). On the other hand, the first camera 101 serving as the communication apparatus on the service start requested side waits for receiving a connection request (step S401).

The third camera 103 first transmits a Probe request message by broadcast in search processing (M301). Upon receiving the Probe request message, the first camera 101 transmits a Probe response message to the third camera 103 (M302). Then, the third camera 103 transmits, to the first camera 101, a service search request message containing information about the image transfer service (M303). The first camera 101 is compatible with the image transfer service, thus transmitting, to the third camera 103, a service search response message containing information about the image transfer service (M304).

Note that, for example, a Service Discovery Request and a Service Discovery Response, respectively, are used for the service search request message (M303) and the service search response message (M304). Note that a Service Discovery need not be used to obtain information about compatibility/incompatibility with the service and the communication start of the service, but another method may be used. Information may be obtained by, for example, processing of causing each communication apparatus to store information of the communication partner apparatus in advance and reading out information from that storage device (a memory or the like).

If the third camera 103 discovers the partner apparatus in communication related to a desired service by the above-described search processing (YES in step S502), the process advances to step S503. If the third camera 103 does not discover the communication partner apparatus (NO in step S502), search processing for the communication partner apparatus is executed again. Note that in this embodiment, the third camera 103 discovers (recognizes) the first camera 101 as the partner apparatus in communication related to the image transfer service by executing search processing for the communication partner apparatus compatible with the service. Similarly, the first camera 101 also discovers (recognizes) the third camera 103 as the partner apparatus in communication related to the image transfer service.

Then, the third camera 103 transmits a connection request message to the first camera 101 (M305 and step S503). For example, a Provision Discovery Request or a Group Owner Negotiation Request of the Wi-Fi Direct is used for the connection request message. Note that this need not be used for the connection request message, but another message may be used.

Upon receiving the connection request message (M305 and YES in step S401), the first camera 101 then determines whether the local apparatus has already joined the wireless network (step S402). At this time, the first camera 101 has not yet joined the wireless network (NO in step S402), and thus the process advances to step S415. Then, the first camera 101 transmits, as a response to the connection request message, a connection request response message to the third camera 103 (M306 and step S415). For example, a Provision Discovery Response or a Group Owner Negotiation Response of the Wi-Fi Direct is used for the connection request response message. Note that this need not be used for the connection request response message, but another message may be used. The first camera 101 transmits a connection request response, and then executes connection processing (step S416).

Upon receiving the connection request response message (M306 and YES in step S504), the third camera 103 then determines, based on information contained in the received connection request response message, whether to enter the existing wireless network (step S505). This determination is made based on, for example, whether the connection request response message from the first camera 101 contains information indicating that the third camera 103 should enter the existing wireless network. Note that the connection request response message from the first camera 101 does not contain information indicating that the third camera 103 enters the existing wireless network (NO in step S505). Therefore, the third camera 103 advances processing to step S507. Then, the third camera 103 determines whether the connection request response message contains connection waiting information of whether to wait for connection (step S507). Connection waiting information is not contained in the connection request response message from the first camera 101 (NO in step S507). Therefore, the third camera 103 then executes connection processing (step S509).

Note that the roles of the first camera 101 and the third camera 103 in the P2P group are decided by the connection request message and the connection request response message. Note that it is decided in this embodiment that the first camera 101 operates as the Client and the third camera 103 operates as the GO. After that, connection processing compatible with the Wi-Fi Direct protocol is executed (M307) and the wireless network 104 is formed. After the wireless network 104 is formed and setting processing needed for communication related to the service is executed, image transfer service data communication is performed between the first camera 101 and the third camera 103, thereby transferring the image (M308).

Then, the image transfer service is further started between the first camera 101 and the second camera 102 while executing the image transfer service between the first camera 101 and the third camera 103. When the first camera 101 and the second camera 102 accept the image transfer service start operation by the user, the second camera 102 serving as the communication apparatus on the service start requesting side executes search processing for the communication partner (step S501). On the other hand, the first camera 101 serving as the communication apparatus on the service start requested side waits for receiving the connection request (step S401).

Then, the first camera 101 executes processing before advancing to step S402 and the second camera 102 executes processing before advancing to step S504 in the same manner as in processing executed between the first camera 101 and the third camera 103. At this time, messages (M309 to M313) exchanged between the first camera 101 and the second camera 102 are also same as the messages (M301 to M305) exchanged between the first camera 101 and the third camera 103, and a detailed description thereof will be omitted.

Upon receiving the connection request (YES in step S401), the first camera 101 then determines whether the local apparatus has already been joining the wireless network (step S402). The first camera 101 has already joined the wireless network 104 (YES in step S402), and thus the process advances to step S403. Then, the first camera 101 determines whether it is joining the wireless network in a terminal mode (Client) (step S403). In this embodiment, the first camera 101 is joining the wireless network 104 as the Client (YES in step S403), and thus the process advances to step S404.

Note that the first camera 101 transmits, as the response to the connection request message, the connection request response message to the second camera 102 (step S415) if the local apparatus is joining the wireless network in a base station mode (GO). Then, connection processing for performing direct communication between the first camera 101 and the second camera 102 is executed (step S416). In this case, the second camera 102 receives the connection request response message (YES in step S504) and determines whether the message contains information indicating that the second camera 102 should enter the existing network (step S505). In this case, the message does not contain information indicating that the second camera 102 should enter the existing network. Therefore, the second camera 102 then confirms that connection waiting information is not received (NO in step S507) and executes connection processing with the first camera 101 (step S509).

In step S404, the first camera 101 executes network entry determination processing for determining whether to cause the second camera 102 serving as an apparatus on the requesting side of communication related to the service to enter the wireless network 104. Note that if the second camera 102 is caused to enter the wireless network 104, it enters the wireless network 104 as the Client. FIG. 6 shows the example of the procedure of network entry determination processing in this embodiment.

When network entry determination processing is started, the first camera 101 first determines whether communication related to a service to be executed is a service which requires confidentiality protection (step S601). In this embodiment, when executing the image transfer service by causing the second camera 102 to enter the wireless network 104, data transmitted/received between the first camera 101 and the second camera 102 passes through the third camera 103 (GO). Accordingly, the third camera 103 may read the data transmitted/received between the first camera 101 and the second camera 102. Therefore, for the service which requires confidentiality protection (YES in step S601), it is necessary to further determine, when communication via the third camera 103 is performed, whether confidentiality protection is achieved in that communication (steps S602 and S603). On the other hand, it is considered that no problem is presented for the service which does not require confidentiality protection (NO in step S601) even if the third camera 103 reads the transmitted/received data. Accordingly, in this case, the first camera 101 determines that the second camera 102 can enter the network without executing further determination processing (step S605). Note that in this case, the first camera 101 determines that the second camera 102 which requires the service can enter the existing wireless network 104 as the Client. Then, the first camera 101 terminates network entry determination processing.

Note that whether the service requires confidentiality protection can be determined based on the type of service. For example, since the image transfer service executed in this embodiment transfers image data possessed by an individual, it can be determined that the service requires confidentiality protection. On the other hand, for example, when a service such as a game is executed, it can be determined that such a service does not require confidentiality protection. Whether confidentiality protection is required may also be determined based on information other than the type of service. Note that entry/non-entry determination processing of FIG. 6 which includes determination of whether confidentiality protection is required is merely an example, but this determination processing for the necessity of confidentiality protection may not be executed. For example, entry/non-entry may be determined in advance for each type of service, and whether to cause the communication apparatus on the service start requesting side to enter the network may be determined based on the type of service requested.

When determining that the service to be executed requires confidentiality protection (YES in step S601), the first camera 101 then determines that secure communication is used for the service to be executed (step S602). Determining whether communication is secure is to determine whether security is ensured for that communication by the Peer-to-Peer between the apparatuses which perform communication, that is, between the first camera 101 and the second camera 102 in this embodiment. For example, when an HTTP (Hyper Text Transfer Protocol) is used in image transfer processing, whether an HTTPS (HTTP over SSL (Secure Socket Layer)) is used is determined. The HTTPS is communication where encryption/decryption is performed between an HTTP client and an HTTP server, and thus can be performed without reading data by a communication apparatus which passes through data communication. Therefore, when the HTTPS is used for communication related to the service, the first camera 101 can determine that secure communication is used for that service.

When determining that secure communication is used (YES in step S602), the first camera 101 determines that the second camera 102 can enter the network (step S605). Note that the first camera 101 determines that the second camera 102 which requests the service can enter the existing wireless network 104 as the Client, and terminates network entry determination processing.

On the other hand, when determining that secure communication is not used (NO in step S602), the first camera 101 then determines whether the communication apparatus of the GO (third camera 103) in the wireless network is reliable (step S603). When determining that the third camera 103 is reliable (YES in step S603), the first camera 101 determines that the second camera 102 can enter the network (step S605). Then, the first camera 101 terminates network entry determination processing. On the other hand, when determining that the third camera 103 is not reliable (NO in step S603), the first camera 101 determines that the second camera 102 cannot enter the network (step S604) and terminates network entry determination processing.

Whether the communication apparatus is reliable can be determined by using, for example, attribute information. The first camera 101 maintains, for example, group information such as a "My group" as attribute information, and determines that the communication apparatus of the GO (third camera 103) is reliable when determining that the GO belongs to the same group as that of the first camera 101. That is, when it is determined that the third camera 103 maintains attribute information of the same group as that of the first camera 101, the first camera 101 determines that the third camera 103 is reliable. Note that the first camera 101 may determine that the GO is reliable only when not only the two apparatuses of the first camera 101 and the third camera 103 but also all the apparatuses of the first camera 101, the second camera 102, and the third camera 103 include the same attribute information.

Whether the communication apparatus of the GO is reliable may be determined based on, in addition to attribute information, whether communication related to the same service has been performed before. In this embodiment, for example, the first camera 101 can make determination based on whether the image transfer service has been executed before via the third camera 103 between the first camera 101 and the second camera 102. That is, for example, the first camera 101 maintains, as history information, information obtained when the image transfer service has been executed before via another apparatus, and then can determine whether the third camera 103 is reliable based on that history information. This determination may also be made by using Persistent information in the Wi-Fi Direct.

Whether the communication apparatus of the GO is reliable may also be determined based on, in addition to the respective criteria described above, any information from which it can be determined that the communication apparatus of the GO is reliable.

Network entry determination processing of this embodiment combines several determination processing operations (steps S601 to S603). However, whether a network entry is possible may be determined based on only any one of these determination processing operations. Further, a criterion which allows the network entry may include approval by the third camera 103 serving as the GO in the wireless network 104 that the second camera 102 can enter.

Referring back to FIG. 4, when network entry determination processing (step S404) ends, the first camera 101 then branches processing based on the result of network entry determination processing (step S405). That is, the process advances to step S406 when the first camera 101 determines that the second camera 102 can enter the wireless network (YES in step S405), and the process advances to step S408 when the first camera 101 determines that the second camera 102 cannot enter the wireless network (NO in step S405). Note that in this embodiment, the first camera 101 determines that the second camera 102 can enter the wireless network 104.

In this case, the first camera 101 transmits the connection request response message which contains information indicating that the second camera 102 is caused to enter the wireless network 104 (M314 and step S406). Then, the first camera 101 executes network entry processing for causing the second camera 102 to enter the wireless network 104 (step S407).

On the other hand, upon receiving the connection request response message (M314 and YES in step S504), the second camera 102 determines based on information contained in the connection request response message whether to enter the existing wireless network (step S505). Here, the connection request response message contains information indicating that the second camera 102 enters the existing wireless network. Therefore, the second camera 102 determines that it should enter the existing wireless network (YES in step S505), and executes entry processing to the existing wireless network 104 (step S506).

An example of the procedure of network entry processing by the first camera 101 will now be described with reference to a flowchart of FIG. 7.

When network entry processing is started, the first camera 101 starts wireless parameter setting processing (step S701). In this embodiment, WPS is used in wireless parameter setting processing, as an example. Then, the first camera 101 determines whether it can activate the base station mode and operate as the GO (step S702). This determines whether the first camera 101 can operate the GO simultaneously while communicating with the third camera 103 as the Client. Note that the first camera 101 may determine that it can operate as the GO, and operates by setting the local apparatus to serve as the GO when the communication partner apparatus is incompatible with a network entry function (has only a conventional Wi-Fi Direct function). The process advances to step S703 when the first camera 101 determines that it can operate as the GO (YES in step S702), and the process advances to step S704 when the first camera 101 determines that it cannot operate as the GO (NO in step S702).

In step S703, the first camera 101 activates the base station mode and operates as the GO. Note that an operation as the GO at this time refers to the operation as the GO only during wireless parameter setting processing. A wireless network established by the first camera 101 as the GO is different from the wireless network 104. After the first camera 101 starts operating as the GO, the process advances to step S705.

In step S704, the first camera 101 notifies the third camera 103 operating as the GO that it operates as an external apparatus which provides a wireless parameter, and then the process advances to step S705. This corresponds to an external Registrar function in WPS.

In step S705, the first camera 101 starts a wireless parameter providing function. Then, the first camera 101 waits for a partner device to which a parameter is provided to be connected (step S706). When detecting connection of the partner device (YES in step S706), the first camera 101 then determines whether the partner device is a desired partner device (step S707). In this embodiment, the first camera 101 determines whether the partner device is the second camera 102. When the first camera 101 determines that the partner device connected is the desired partner device (YES in step S707), the process advances to step S708. On the other hand, when the first camera 101 determines that the partner device connected is not the desired partner device (NO in step S707), the process returns to a wait (step S706) for connection of the partner device which provides the parameter.

The first camera 101 starts wireless parameter setting processing (for example, WPS processing) in step S708. When wireless parameter setting processing is started, the first camera 101 transfers, to the second camera 102, the parameter of the wireless network 104 to which the first camera 101 is currently connected (step S709). When operating as the external apparatus which provides the wireless parameter, the first camera 101 provides the wireless parameter via the GO. In this embodiment, the wireless parameter is transferred from the first camera 101 to the second camera 102 via the third camera 103.

The first camera 101 terminates the wireless parameter providing function (step S710) after transferring the wireless parameter, and then terminates network entry processing. When activating the base station mode and operating as the GO, the first camera 101 stops activating the base station mode and also stops operating as the GO. On the other hand, when operating as the external apparatus which provides the wireless parameter, the first camera 101 notifies the GO that it has stopped the function.

Note that the second camera 102 executes, as network entry processing, conventional WPS processing as the Client. Note that the connection request response message (M314) can notify that the second camera 102 receives the wireless parameter from the first camera 101 directly or via the third camera 103. When obtaining the wireless parameter from the first camera 101 directly, the second camera 102 executes wireless parameter setting processing with the first camera 101. On the other hand, when obtaining the wireless parameter via the third camera 103, the second camera 102 is connected to the third camera 103 serving as the GO in the wireless network 104 and executes wireless parameter setting processing with the first camera 101 via the third camera 103.

Note that network entry processing that has been described so far is merely an example, but the present invention is not limited to this. For example, network entry processing may be implemented by using an Invitation protocol in the Wi-Fi Direct. In this case, the first camera 101 transmits an Invitation Request containing information about the wireless network 104 to the second camera 102 so as to enter the wireless network 104. After receiving the Invitation Request, the second camera 102 transmits, as a response to it, an Invitation Response to the first camera 101 and enters the wireless network 104 as the Client.

Referring back to FIGS. 4 and 5, when network entry processing is complete in steps S407 and S506, the first camera 101 and the second camera 102 terminate service start processing. The second camera 102 executes setting processing needed for service communication after connected to the wireless network 104 as the Client (M315), and performs image transfer service data communication with the first camera 101 in the wireless network 104 (M316).

Note that when the first camera 101 determines that the second camera 102 cannot enter the network in step S405 (NO in step S405), the process advances to step S408. In step S408, the first camera 101 determines whether the local apparatus can activate the base station mode and operate as the GO. This determines whether the first camera 101 can operate the GO simultaneously while communicating with the third camera 103 as the Client. The process advances to step S415 when the first camera 101 determines that it can operate as the GO (YES in step S408), and the process advances to step S409 when the first camera 101 determines that it cannot operate as the GO (NO in step S408).

The first camera 101 executes connection processing by the Wi-Fi Direct (step S415) when it can operate as the GO. In this case, the first camera 101 establishes, as the GO, a new wireless network different from the wireless network 104 and communicates with the second camera 102 via the new wireless network.

In step S409, the first camera 101 displays, on the display unit, whether to cause the second camera 102 to wait for connection and notifies the user of it until the end of communication with the third camera 103. Subsequently, the first camera 101 determines whether the user has instructed the second camera 102 to wait for connection (step S410). Then, the first camera 101 advances processing to step S412 if an instruction to wait for connection is given (YES in step S410), and advances processing to step S411 if the instruction to wait for connection is not given (NO in step S410).

In step S411, the first camera 101 transmits the connection request response message which contains information indicating that connection is impossible (step S411), and then terminates service start processing. In step S412, the first camera 101 transmits, to the second camera 102, connection waiting information for the second camera 102 to wait for connecting to the first camera 101. Connection waiting information may be transmitted while being contained in the connection request response message or may be transmitted separately from the connection request response message. After transmitting connection waiting information, the first camera 101 waists for the completion of communication related to a service with the third camera 103 (step S413).

On the other hand, upon receiving connection waiting information (YES in step S507), the second camera 102 waits for receiving a connection permission information message indicating that connection to the first camera 101 becomes possible (step S508). When the service with the third camera 103 is complete and connection with the second camera 102 becomes possible (YES in step S413), the first camera 101 transmits, to the second camera 102, the connection permission information message which contains information indicating that connection becomes possible (step S414). Then, the first camera 101 advances processing to step S416. Upon receiving the connection permission information message from the first camera 101 (YES in step S508), the second camera 102 advances processing to step S509.

The first camera 101 and the second camera 102, respectively, execute connection processing for direct communication by the Wi-Fi Direct in steps S416 and S509. The first camera 101 and the second camera 102 execute setting processing for communication related to the image transfer service after the completion of connection processing, thereby allowing image transfer service data communication.

Figure 8:
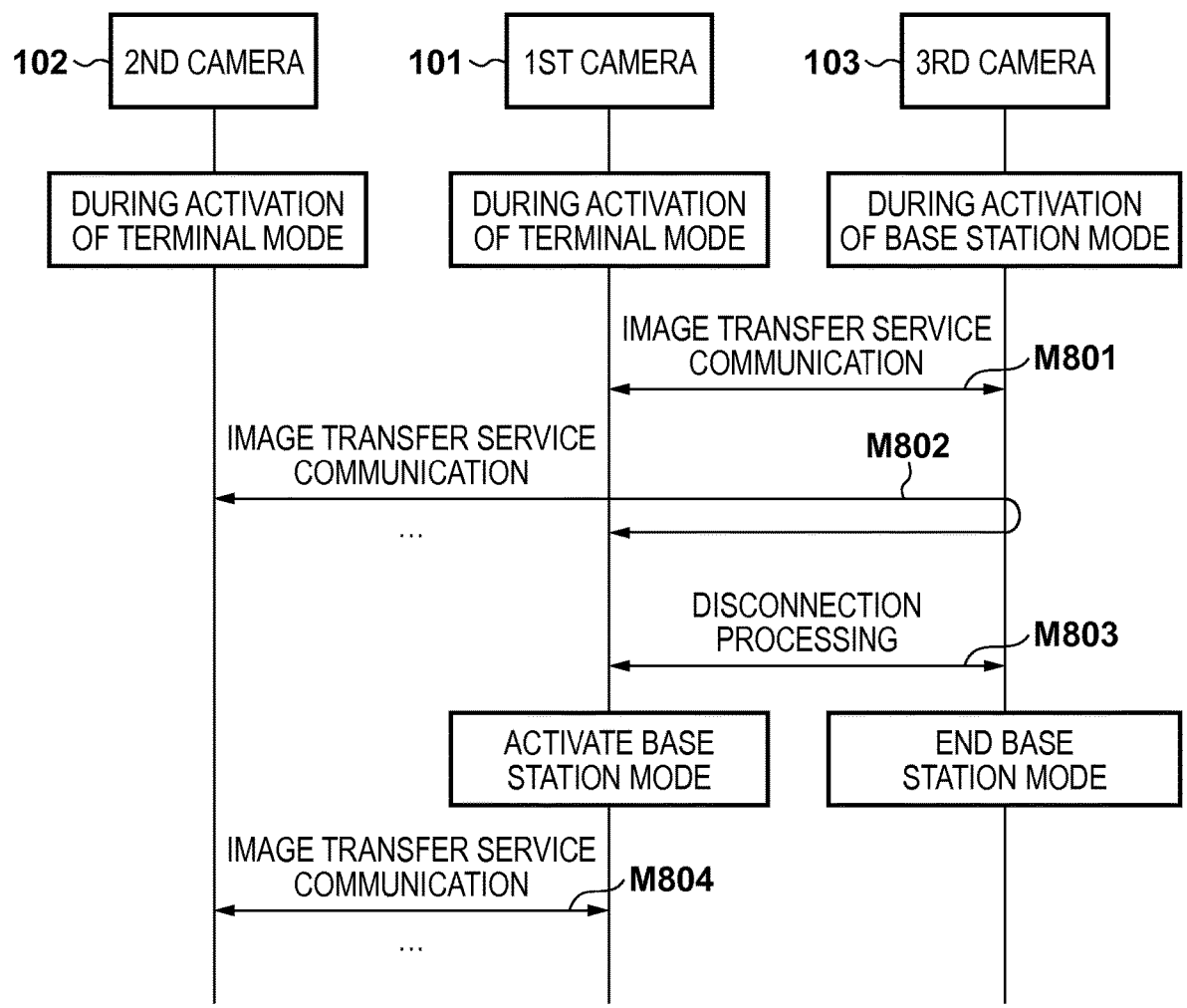
FIG. 8 is a sequence chart showing an example of the flow of the signal transmitted/received in the entire wireless communication system when the third camera 103 leaves.
Figure 9:
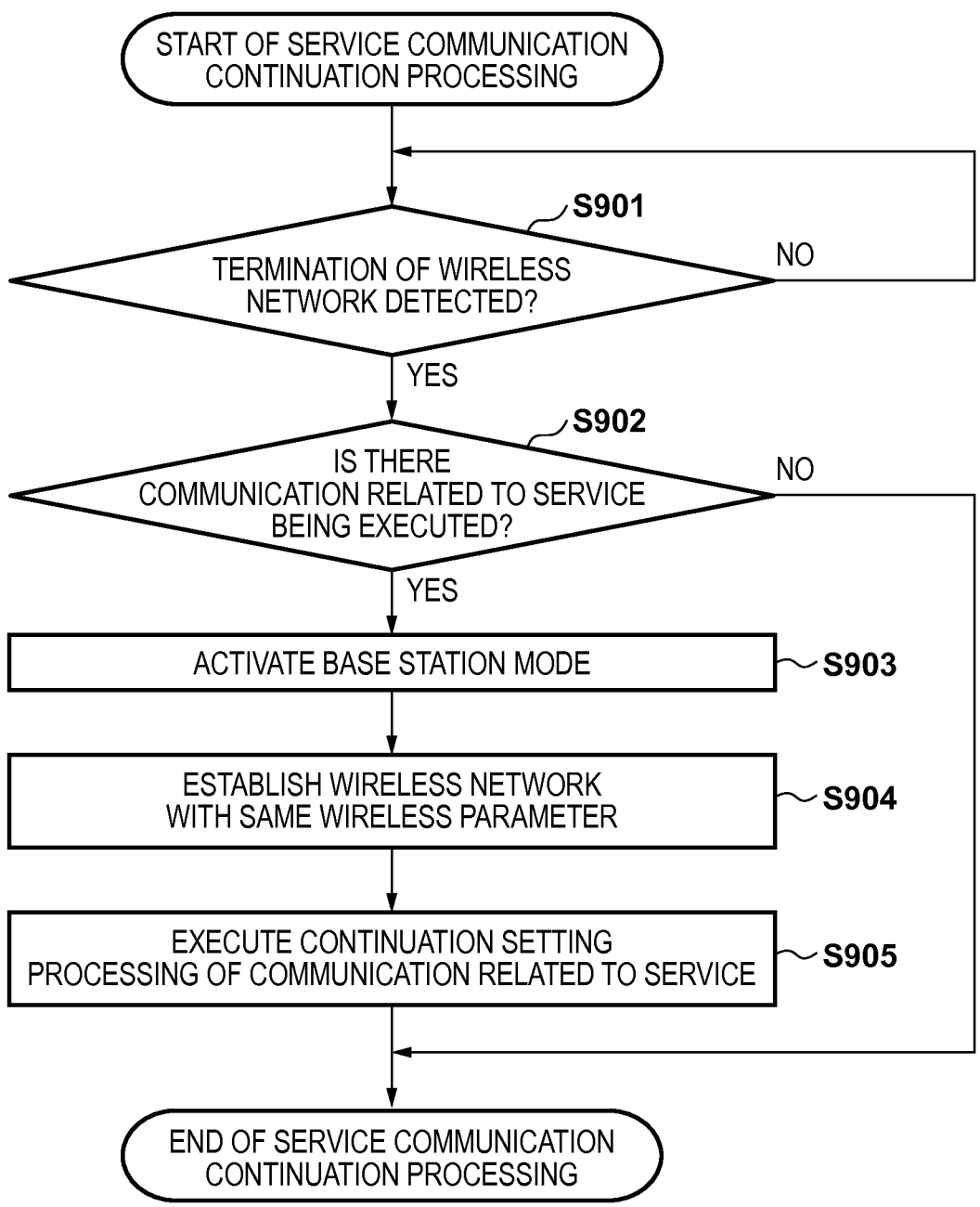
FIG. 9 is a flowchart showing an example of the sequence of service communication continuation processing by the first camera 101 when the third camera 103 leaves.

Processing when the third camera 103 has left while the first camera 101 and the second camera 102 perform image transfer service data communication via the third camera 103 will now be described with reference to FIGS. 8 and 9. Note that, as described above, the third camera 103 establishes the wireless network 104 as the GO, and the first camera 101 and the second camera 102 join the wireless network 104 as the Clients. Data communication (M801) between the first camera 101 and the third camera 103, and data communication (M802) between the first camera 101 and the second camera 102, respectively, are performed for the image transfer service.

Processing of the first camera 101 when, in that situation, data communication related to the image transfer service between the first camera 101 and the third camera 103 is complete, and the third camera 103 stops operating as the GO to terminate the wireless network 104 will be described below. The procedure of processing of the first camera 101 will be described with reference to a flowchart showing service communication continuation processing in FIG. 9.

When detecting the termination of the wireless network (YES in step S901), the first camera 101 determines whether there is another communication related to a service being executed (step S902). The process advances to step S903 when the first camera 101 determines that there is communication related to the service being executed (YES in step S902). Service communication continuation processing ends when the first camera 101 determines that there is no such communication (NO in step S902).

In step S903, the first camera 101 executes operation mode switching processing for switching from a state where it operates as the Client in the terminal mode to a state where it operates as the GO in the base station mode. The first camera 101 activates the base station mode to start operating as the GO, and establishes a new wireless network (step S904). At this time, the first camera 101 establishes the wireless network with the same parameter as the parameter of the wireless network 104 that has been established by the third camera 103 as the GO. The parameter includes at least one of, for example, a network identifier such as an SSID (Service Set Identifier) or a BSSID (Basic Service Set Identifier), an authentication method, an encryption method, encryption key, and the like.

After establishing the wireless network, the first camera 101 executes processing needed to continue image transfer service data communication between the first camera 101 and the second camera 102 (step S905). In this embodiment, for example, IP address setting processing or the like is executed. Depending on a certain protocol used for service data communication, a routing function is validated to virtually route an IP address used when the third camera 103 serves as the GO and the IP address of the first camera 101. The first camera 101 terminates service communication continuation processing after terminating service communication continuation setting processing in step S905.

This makes it possible to continue the image transfer service between the first camera 101 and the second camera 102 even after the third camera 103 finishes establishing the wireless network 104.

As described above, when receiving a request for communication related to the service, the first camera 101 can autonomously determine whether to enter the existing wireless network and can perform that communication by using an appropriate wireless network even if the wireless network has already been formed. This makes it possible to suppress resource consumption caused by forming the wireless network wastefully. It becomes also possible to perform secure data communication by determining, based on confidentiality protection of the service or the like, whether to enter the existing wireless network.

Processing Example 2

In the processing example 1, a case in which the first camera 101 serving as the apparatus on the service start requested side determines whether to cause the second camera 102 to enter the wireless network is described. However, the present invention is not limited to this. For example, the second camera 102 serving as the apparatus on the service start requesting side may determine whether to enter the wireless network. This case will be described below.

Note that in this case, the formed network determination unit 211 of the second camera 102 determines whether the communication partner apparatus joins the wireless network that has already been formed. When the formed network determination unit 211 determines that the communication partner apparatus joins the wireless network that has already been formed, the network entry determination unit 218 determines whether the local apparatus which executes the new service joins the wireless network. When the network entry determination unit 218 determines that the local apparatus joins the wireless network that the communication partner apparatus joins, the network entry processing unit 219 executes processing for the local apparatus to join the wireless network.

Figure 10:
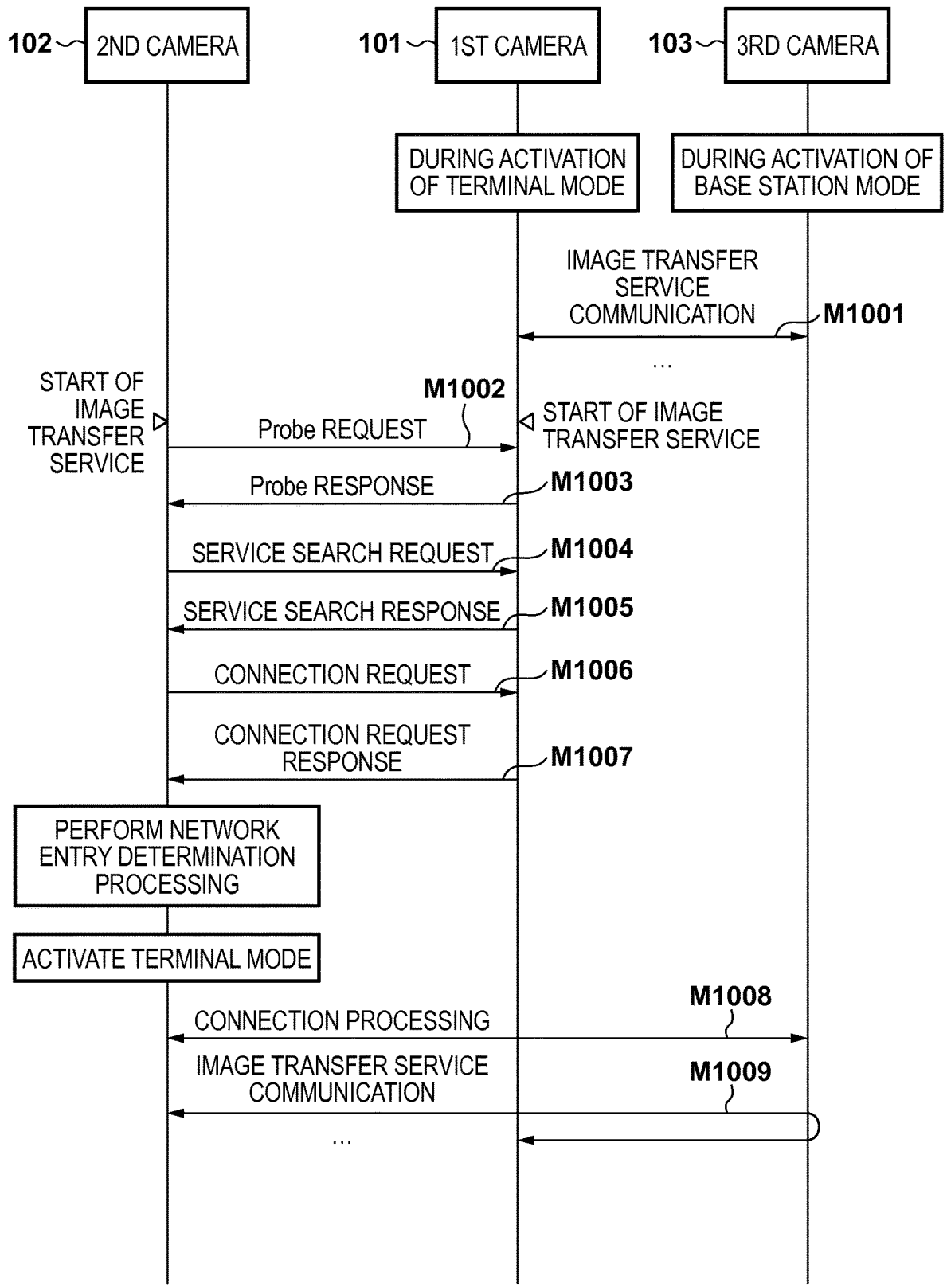
FIG. 10 is a sequence chart showing the second example of the flow of the signal transmitted/received in the entire wireless communication system.
Figure 11:
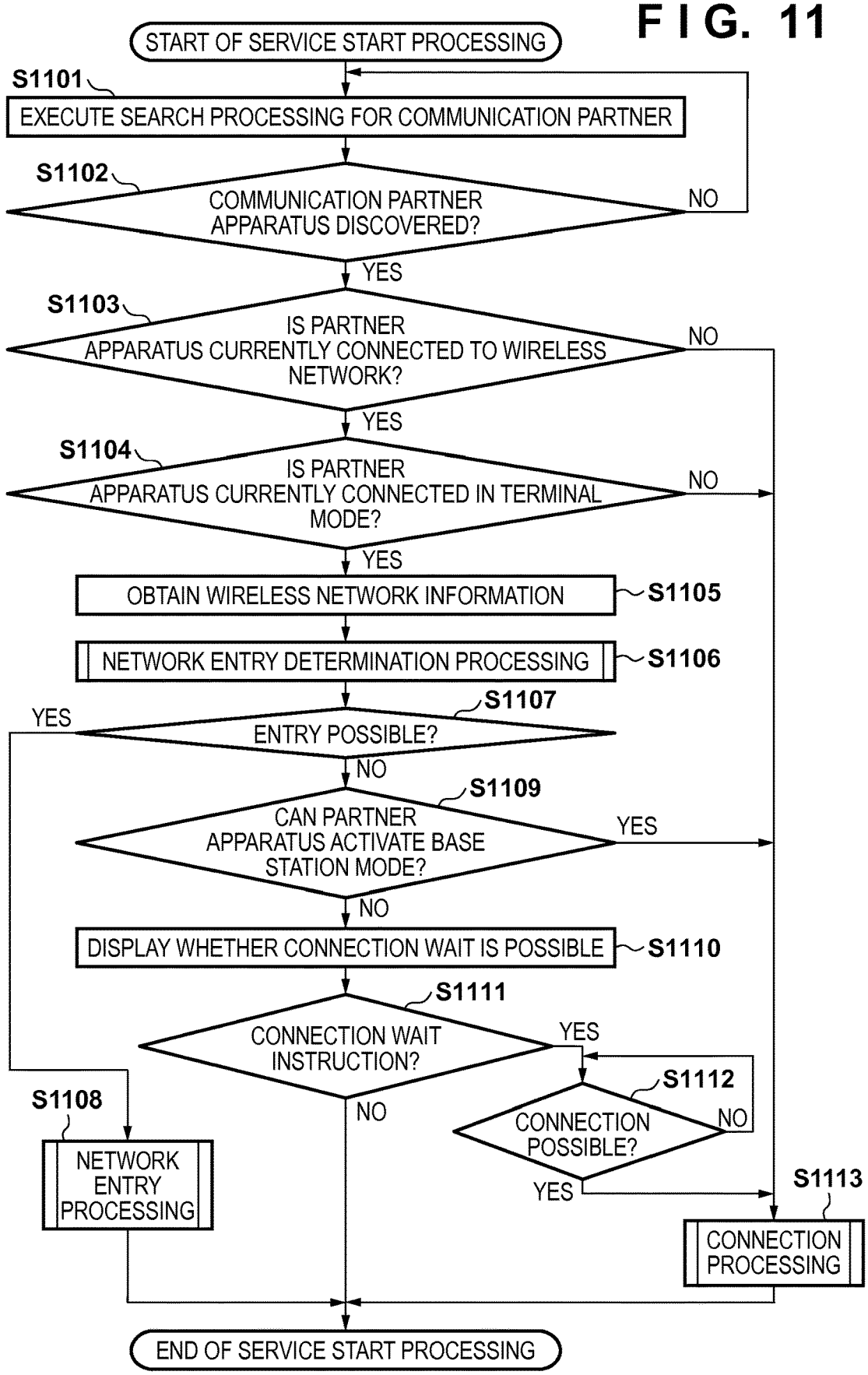
FIG. 11 is a flowchart showing another example of the sequence of service start processing by the second camera 102.

Processing contents will be described below with reference to FIGS. 10 and 11. FIG. 10 is a sequence chart showing the flow of a signal (message) transmitted/received in the entire wireless communication system in this processing example. FIG. 11 is a flowchart showing service start processing executed by the second camera 102 in this processing example.

First, the wireless network 104 has already been formed between the first camera 101 and the third camera 103, and the image transfer service is executed (M1001). Note that as in the processing example 1, the third camera 103 operates as the GO to form the wireless network 104, and the first camera 101 is joining the wireless network 104 as the Client. The first camera 101 is the apparatus on the service start requested side, and the second camera 102 and the third camera 103 operate as the apparatuses on the service start requesting side.

When the first camera 101 and the second camera 102 accept the image transfer service start operation by the user, the second camera 102 serving as the communication apparatus on the service start requesting side executes search processing for the communication partner (step S1101). Note that the processing contents are the same as in the processing example 1, and a detailed description thereof will be omitted. Upon discovering the partner apparatus in communication related to the service (YES in step S1102), the second camera 102 then determines whether the communication partner apparatus (first camera 101) is being connected to the wireless network (step S1103). Note that whether the communication partner apparatus is being connected to the wireless network is determined by using, for example, a frame defined by the Wi-Fi Direct. Note that this determination may be made by extending the frame defined by the Wi-Fi Direct.

The process advances to step S1104 when the second camera 102 determines that the communication partner apparatus is being connected to the wireless network (YES in step S1103), and the process advances to step S1113 when the second camera 102 determines that the communication partner apparatus has not yet been connected to the wireless network (NO in step S1103). In step S1113, the second camera 102 executes connection processing by the Wi-Fi Direct and terminates processing. Note that in this processing example, connection processing may include processing of a connection request message (M1006) and a connection request response message (M1007). In this case, the connection request message (M1006) and the connection request response message (M1007) are transmitted/received after network entry determination processing. In this processing example, the first camera 101 is being connected to the wireless network 104, and thus the process advances to step S1104.

In step S1104, the second camera 102 determines whether the communication partner apparatus (first camera 101) is connected to the wireless network in the terminal mode. Whether the communication partner apparatus operates in the terminal mode can be determined by using the frame defined by the Wi-Fi Direct. Note that this determination may be made by extending the frame defined by the Wi-Fi Direct. The second camera 102 advances processing to step S1105 when the communication partner apparatus is currently connected in the terminal mode (YES in step S1104), and advances processing to step S1113 when the communication partner apparatus is not operating in the terminal mode (NO in step S1104). Processing in step S1113 is the same as the above-described processing.

In this processing example, the first camera 101 is currently connected to the wireless network 104 in the terminal mode (YES in step S1104), and thus the second camera 102 obtains information about the wireless network to which the communication partner apparatus (first camera 101) is connected (step S1105). Wireless network information can be, for example, network identification information which determines which wireless network the communication partner apparatus is connected, information about the base station of the wireless network formed, and the like. These pieces of information are obtained by using, for example, a function defined by the Wi-Fi Direct such as a Device Discoverability frame or the like. It is possible to obtain which wireless network the communication partner apparatus is connected by using the Device Discoverability frame.

Then, the second camera 102 executes network entry determination processing (step S1106). Network entry determination processing in this processing example is the same as network entry determination processing described in the processing example 1, and thus a detailed description thereof will be omitted.

When network entry determination processing is complete, the second camera 102 branches processing based on the result of network entry determination processing (step S1107). That is, the second camera 102 advances processing to step S1108 when a network entry is possible (YES in step S1107), and advances processing to step S1109 when the network entry is impossible (NO in step S1107).

In this processing example, the second camera 102 determines that it can enter the wireless network 104 (YES in step S1107). In this case, the second camera 102 executes wireless network entry processing (S1108). Network entry processing of the second camera 102 in this processing example is the same as network entry processing of the first camera 101 described in the processing example 1. In addition, the second camera 102 may execute, based on information about the wireless network to which the communication partner apparatus is connected obtained in step S1105, connection processing for direct communication by the Wi-Fi Direct with the GO which forms the wireless network. In this processing example, connection processing by the Wi-Fi Direct is executed between the second camera 102 and the third camera 103. In this case, wireless parameter setting processing by WPS is executed between the second camera 102 (Client) and the third camera 103 (GO), thus eliminating the need for WPS processing with the first camera 101.

The second camera 102 terminates service start processing after terminating network entry processing and completes connection to the wireless network 104 established by the third camera 103 (M1008). Then, the second camera 102 executes setting processing needed for image transfer service data communication, and the image transfer service between the second camera 102 and the first camera 101 is started via the third camera 103 (M1009).

Note that when determining that network entry is possible in network entry determination processing in step S1106 (NO in step S1107), the second camera 102 determines whether the communication partner apparatus can activate in the base station mode (step S1109). This determines whether the communication partner apparatus can operate as the GO simultaneously while currently connected to the wireless network as the Client. In this processing example, whether the first camera 101 can activate as the GO while currently connected to the wireless network 104 as the Client is determined. Whether the communication partner apparatus can activate the base station mode is determined by using the frame defined by the Wi-Fi Direct. Note that this determination may be made by extending the frame defined by the Wi-Fi Direct.

When the communication partner apparatus can active the base station mode (YES in step S1109), the second camera 102 executes connection processing by the Wi-Fi Direct (step S1113). In this case, the communication partner apparatus establishes the new wireless network different from the wireless network 104. In this processing example, when the first camera 101 can activate as the GO, the first camera 101 establishes the new wireless network and the second camera 102 is connected to the new wireless network as the Client.

When the communication partner apparatus cannot activate the base station mode (NO in step S1109), the second camera 102 displays, on the display unit, whether to wait for connection with the first camera 101 (step S1110). At this time, the second camera 102 may display a message that the first camera 101 forms a wireless network with another communication apparatus and cannot be connected. Then, the second camera 102 advances processing to step S1112 when accepting the instruction to wait for connection from the user (YES in step S1111), and terminates service start processing when not waiting for connection (NO in step S1111).

In step S1112, the second camera 102 waits until the first camera 101 can be connected. In this processing example, the second camera 102 periodically monitors the termination of the wireless network 104 between the first camera 101 and the third camera 103. Note that the second camera 102 may determine whether connection with the first camera 101 becomes possible by a method other than this. When determining that connection with the first camera 101 becomes possible (YES in step S1112), the second camera 102 executes connection processing by the Wi-Fi Direct with the first camera 101 (step S1113).

This allows the apparatus on the service communication start requesting side to autonomously determine whether to enter the existing wireless network.

Each process described above has exemplified a case in which the wireless LAN complying with the IEEE802.11 standard series is used for the wireless communication. However the present invention is not limited to this. The camera can use wireless communication media of, for example, wireless USB, MBOA, Bluetooth, UWB, ZigBee, (Near Field Communication), and the like. Note that MBOA stands for Multi Band OFDM Alliance. UWB includes wireless USB, wireless 1394, WINET, and the like.

The embodiment described above has exemplified a case in which all the communication apparatuses have the above-described functions, but is not limited to this. It is only necessary that at least the communication apparatus which executes network entry determination processing has the above-described functions. Further, the embodiment described above has exemplified a case in which a wireless LAN communication mode is an infrastructure mode, but the above-described explanation is also applicable to a case in which the wireless LAN communication mode is an ad hoc mode.

Furthermore, the embodiment described above has exemplified a case in which Wi-Fi Direct is used in wireless LAN connection processing. However, the wireless LAN connection processing is not limited to this and can be implemented using another protocol processing. The above-described explanation is also applicable to ordinary wireless LAN connection.

According to the present invention, it becomes possible to select between forming the new wireless network and connecting to the existing wireless network appropriately when staring communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234908, filed Nov. 19, 2014, which is hereby incorporated by reference herein in its entirety.

What is claimed is:

1. A communication apparatus comprising:
one or more processors; and
a memory storing instructions which, when executed by the one or more processors, cause the communication apparatus to:
  perform communication in a wireless local area network (LAN) by operating as one of a base station and a terminal station of the wireless LAN;
  receive, from a first another apparatus, a search request containing information about a service to be performed;
  transmit a search response to the first another apparatus;
  receive a connection request from the first another apparatus;
  perform a first determination of whether the communication apparatus is currently connected to the wireless LAN as the terminal station when receiving the connection request;
  perform, in a case where it is determined in the first determination that the communication apparatus is currently connected to the wireless LAN as the terminal station, a second determination of whether to cause the first another apparatus to connect to the currently connected wireless LAN, based on a type of the service contained in the search request;
  establish a wireless LAN different from the currently connected wireless LAN by the communication apparatus and the first another apparatus when it is determined in the first determination that the communication apparatus is currently connected to the wireless LAN as the terminal station and it is determined in the second determination not to cause the first another apparatus to connect to the currently connected wireless LAN;
  communicate with the first another apparatus via a second another apparatus which operates as the base station in the currently connected wireless LAN when it is determined in the first determination that the communication apparatus is currently connected to the wireless LAN as the terminal station and it is determined in the second determination to cause the first another apparatus to connect to the currently connected wireless LAN; and
  communicate with the first another apparatus not via the second another apparatus in the wireless LAN established when it is determined in the first determination that the communication apparatus is currently connected to the wireless LAN as the terminal station and it is determined in the second determination not to cause the first another apparatus to connect to the currently connected wireless LAN.

2. The communication apparatus according to claim 1, wherein the instructions, when executed by the one or more processors, further cause the communication apparatus to further communicate with the first another apparatus directly when the communication apparatus operates as the base station.

3. The communication apparatus according to claim 1, wherein the instructions, when executed by the one or more processors, further cause the communication apparatus to communicate with the first another apparatus by Wi-Fi Direct in the established wireless LAN.

4. The communication apparatus according to claim 1, wherein the instructions, when executed by the one or more processors, further cause the communication apparatus to provide the first another apparatus with a communication parameter needed to perform communication between the communication apparatus and the first another apparatus even in a case where it is determined in the first determination that the communication apparatus is currently connected to the wireless LAN as the terminal station.

5. The communication apparatus according to claim 1, wherein the instructions, when executed by one or more processors, further cause the communication apparatus to determine to cause the first another apparatus to connect to the wireless LAN to which the communication apparatus is currently connected when confidentiality of communication with the first another apparatus needs not be maintained.

6. The communication apparatus according to claim 1, wherein the instructions, when executed by the one or more processors, further cause the communication apparatus to determine to cause the first another apparatus to connect to the wireless LAN to which the communication apparatus is currently connected when confidentiality of communication with the first another apparatus needs to be maintained, and when communication performed with the first another apparatus involves Peer-to-Peer encryption and decryption.

7. The communication apparatus according to claim 1, wherein the instructions, when executed by the one or more processors, further cause the communication apparatus to determine to cause the first another apparatus to connect to the wireless LAN to which the communication apparatus is currently connected when confidentiality of communication with the first another apparatus needs to be maintained, and when the second another apparatus can maintain the confidentiality.

8. The communication apparatus according to claim 7, wherein it is determined, based on whether the communication apparatus, the first another apparatus, and the second another apparatus have performed communication in the same wireless LAN, whether the second another apparatus can maintain the confidentiality.

9. The communication apparatus according to claim 7, wherein it is determined, based on whether the communication apparatus and the second another apparatus have the same attribute, whether the second another apparatus can maintain the confidentiality.

10. The communication apparatus according to claim 1, wherein the instructions, when executed by the one or more processors, further cause the communication apparatus to determine, based on a type of service used in communication with the first another apparatus, whether to cause the first another apparatus to connect to the wireless LAN to which the communication apparatus is currently connected.

11. The communication apparatus according to claim 1, wherein the instructions, when executed by the one or more processors, further cause the communication apparatus to notify the first another apparatus of a wait for an end of communication with the second another apparatus when it is determined in the second determination not to cause the first another apparatus to connect to the wireless LAN to which the communication apparatus is currently connected.

12. The communication apparatus according to claim 11, wherein the instructions, when executed by the one or more processors, further cause the communication apparatus to notify the first another apparatus of connection permission at the end of communication with the second another apparatus when it is determined in the second determination not to cause the first another apparatus to connect to the wireless LAN to which the communication apparatus is currently connected.

13. The communication apparatus according to claim 1, wherein the instructions, when executed by the one or more processors, further cause the communication apparatus to start operating as the base station and continue communication with the first another apparatus by establishing the wireless LAN with the first another apparatus when the first another apparatus is connected to the wireless LAN to which the communication apparatus is currently connected and communication with the second another apparatus which has operated as the base station is ended.

14. The communication apparatus according to claim 13, wherein a communication parameter used in the wireless LAN established with the first another apparatus is the same as a communication parameter used in the wireless LAN that has been established with the second another apparatus.

15. The communication apparatus according to claim 1, wherein the wireless LAN complies with an IEEE802.11 standard series.

16. A control method for a communication apparatus including one or more processors and a memory storing instructions which, when executed by the one or more processors, cause the communication apparatus to perform communication in a wireless local area network (LAN) by operating as one of a base station and a terminal station of the wireless LAN, the method comprising:
  receiving, from a first another apparatus, a search request containing information about a service to be performed;
  transmitting a search response to the first another apparatus;
  receiving a connection request from the first another apparatus;
  performing a first determination of whether the communication apparatus is currently connected to the wireless LAN as the terminal station when receiving the connection request;
  performing, in a case where it is determined in the first determination that the communication apparatus is currently connected to the wireless LAN as the terminal station, a second determination of whether to cause the first another apparatus to connect to the currently connected wireless LAN, based on a type of the service contained in the search request;
  establishing a wireless LAN different from the currently connected wireless LAN by the communication apparatus and the first another apparatus when it is determined in the first determination that the communication apparatus is currently connected to the wireless LAN as the terminal station and it is determined in the second determination not to cause the first another apparatus to connect to the currently connected wireless LAN;
  communicating with the first another apparatus via a second another apparatus which operates as the base station in the currently connected wireless LAN when it is determined in the first determination that the communication apparatus is currently connected to the wireless LAN as the terminal station and it is determined in the second determination to cause the first another apparatus to connect to the currently connected wireless LAN; and
  communicating with the first another apparatus not via the second another apparatus in the established wireless LAN when it is determined in the first determination that the communication apparatus is currently connected to the wireless LAN as the terminal station and it is determined in the second determination not to cause the first another apparatus to connect to the currently connected wireless LAN.

17. A non-transitory computer-readable storage medium storing a computer program which, when executed by a computer of a communication apparatus, causes the communication apparatus to perform communication in a wireless local area network (LAN) by operating as one of a base station and a terminal station of the wireless LAN, to:
- receive, from a first another apparatus, a search request containing information about a service to be performed;
- transmit a search response to the first another apparatus;
- receive a connection request from the first another apparatus;
- perform a first determination of whether the communication apparatus is currently connected to the wireless LAN as the terminal station when receiving the connection request;
- perform, in a case where it is determined in the first determination that the communication apparatus is currently connected to the wireless LAN as the terminal station, second determination of whether to cause the first another apparatus to connect to the currently connected wireless LAN, based on a type of the service contained in the search request;
- establish a wireless LAN different from the currently connected wireless LAN by the communication apparatus and the first another apparatus when it is determined in the first determination that the communication apparatus is currently connected to the wireless LAN as the terminal station and it is determined in the second determination not to cause the first another apparatus to connect to the currently connected wireless LAN;
- communicate with the first another apparatus via a second another apparatus which operates as the base station in the currently connected wireless LAN when it is determined in the first determination that the communication apparatus is currently connected to the wireless LAN as the terminal station and it is determined in the second determination to cause the first another apparatus to connect to the currently connected wireless LAN; and
- communicate with the first another apparatus not via the second another apparatus in the established wireless LAN when it is determined in the first determination that the communication apparatus is currently connected to the wireless LAN as the terminal station and it is determined in the second determination not to cause the first another apparatus to connect to the currently connected wireless LAN.

18. The communication apparatus according to claim 4, wherein the instructions, when executed by the one or more processors, further cause the communication apparatus to provide the first another apparatus with the communication parameter via the second another apparatus when causing the first another apparatus to connect to the wireless LAN to which the communication apparatus is currently connected.

* * * * *